United States Patent
Dunseth (10) Patent No.: US 12,491,970 B2
(45) Date of Patent: Dec. 9, 2025

(54) MULTIDIRECTIONAL TURRET LOADING SYSTEM FOR LOADING/UNLOADING OF FLUID BETWEEN AN OFFSHORE INSTALLATION AND A VESSEL

(71) Applicant: APL NORWAY AS, Kolbjørnsvik (NO)

(72) Inventor: Erik Dunseth, Færvik (NO)

(73) Assignee: APL NORWAY AS, Kolbjørnsvik (NO)

( * ) Notice: Subject to any disclaimer, the term of this patent is extended or adjusted under 35 U.S.C. 154(b) by 559 days.

(21) Appl. No.: 17/916,171

(22) PCT Filed: Mar. 26, 2021

(86) PCT No.: PCT/NO2021/050084
§ 371 (c)(1),
(2) Date: Sep. 30, 2022

(87) PCT Pub. No.: WO2021/201688
PCT Pub. Date: Oct. 7, 2021

(65) Prior Publication Data
US 2023/0192242 A1    Jun. 22, 2023

(30) Foreign Application Priority Data
Apr. 2, 2020    (NO) .................................. 20200402

(51) Int. Cl.
*B63B 27/30*    (2006.01)
*B63B 27/08*    (2006.01)
*B63B 79/40*    (2020.01)

(52) U.S. Cl.
CPC .............. *B63B 27/30* (2013.01); *B63B 27/08* (2013.01); *B63B 79/40* (2020.01)

(58) Field of Classification Search
CPC ......... B63B 27/08; B63B 27/24; B63B 27/30; B63B 27/34; B63B 21/16; B63B 21/50; B63B 21/507; B67D 9/00; B67D 9/02
(Continued)

(56) References Cited

U.S. PATENT DOCUMENTS

| | | | |
|---|---|---|---|
| 6,176,193 B1 * | 1/2001 | Whitby ................... | B63B 35/44 114/230.12 |
| 6,484,658 B1 | 11/2002 | Aanes | |

(Continued)

FOREIGN PATENT DOCUMENTS

| | | |
|---|---|---|
| AU | 20111214362 A1 | 8/2012 |
| NO | 176240 B | 11/1994 |

(Continued)

OTHER PUBLICATIONS

International Bureau, International Search Report in International Application No. PCT/NO2021/050084, mailed Jun. 4, 2021.

(Continued)

*Primary Examiner* — Daniel V Venne
(74) *Attorney, Agent, or Firm* — Leydig, Voit & Mayer, Ltd.

(57) ABSTRACT

A multidirectional turret loading system for loading/unloading of fluid between an offshore installation and a vessel is provided, comprising a winch for pulling a messenger line, a messenger line guide roller system, and a turret positioned on the bow, on the sides or aft on the vessel with a mainly vertical rotational axis. The turret comprises a turret frame with a hose access opening and a messenger line access opening. The turret further comprises a bearing arrangement for rotation of the turret, a coupling manifold mounted near the hose access opening, a crude line turret swivel mounted in the center of the turret connecting the coupling manifold to a crude line of the vessel and at least one motor for rotating the turret.

10 Claims, 6 Drawing Sheets

(58) Field of Classification Search
USPC .............................................. 114/230.12, 382
See application file for complete search history.

(56) References Cited

U.S. PATENT DOCUMENTS

| | | | |
|---|---|---|---|
| 7,614,927 B2 | 11/2009 | Olsen et al. | |
| 10,946,938 B2 | 3/2021 | Albrigsten et al. | |
| 10,974,793 B2 * | 4/2021 | Smedal ................. | B63B 21/508 |

FOREIGN PATENT DOCUMENTS

| | | |
|---|---|---|
| NO | 305233 B1 | 4/1999 |
| NO | 342287 A1 | 4/2018 |
| WO | WO 93/06001 A2 | 4/1993 |
| WO | WO 98/07616 A1 | 2/1998 |
| WO | WO 2011/098527 A1 | 8/2011 |

OTHER PUBLICATIONS

International Bureau, Written Opinion of the International Searching Authority in International Application No. PCT/NO2021/050084, mailed Jun. 4, 2021.

International Bureau, International Preliminary Report on Patentability in International Application No. PCT/NO2021/050084, mailed Jun. 20, 2022.

* cited by examiner

Fig. 1

ISO-VIEW
STARBOARD LOADING

MULTIDIRECTIONAL TURRET LOADING SYSTEM FOR LOADING/UNLOADING OF FLUID BETWEEN AN OFFSHORE INSTALLATION AND A VESSEL

CROSS-REFERENCE TO RELATED APPLICATIONS

This patent application is the U.S. National Stage of International Patent Application No. PCT/NO2021/050084, filed Mar. 26, 2021, which claims the benefit of Norwegian patent application No. 20200402, filed Apr. 2, 2020, which are each incorporated by reference.

Field of the Invention

The invention relates to Offshore installations and in particular to a multidirectional turret loading system for transfer of fluid between a vessel and an offshore installation.

Background

Loading and unloading of fluids from offshore installations at sea is strongly limited by the weather. To be able to make use of narrow weather windows it is important to have a fast and flexible way to connect vessels like shuttle tankers to the offshore installations holding fluids in onboard tanks or being connected to subsea reservoirs. Lately Dynamic Positioning has been developed to a robust and reliable technology, which eliminates the time spent on handling hawsers or other mooring equipment.

Prior art includes U.S. Pat. No. 7,614,927 B2 describing a device for loading and/or unloading of flowable media, comprising a buoy connected to at least one riser and a vessel provided with a pick-up space for the buoy. The vessel is positioned by use of Dynamic Positioning (DP) and the buoy is not anchored. A motor provides controlled movement between the part connected to the risers and the vessel.

NO 342287 describes a coupling system, a transfer system and a method for fluid transfer between a bow area of an elongated vessel and a hydrocarbon delivery installation at open sea. The coupling system comprising a support frame for suspending the coupling system to the vessel and a fluid receiving tube segment fixed to the support frame comprising a coupling device arranged at a first end of the tube segment and configured to establish a leakage free coupling with a hose valve. The coupling system further comprises a remotely controlled drive system configured to simultaneously exert a transverse force generating pendulum movements of the coupling device in the transverse plane, the transverse plane being defined as a plane oriented transverse the vessel and along the vessels height when the coupling system is assembled to the bow area of the vessel, and a longitudinal force generating pendulum movements of the coupling device in a longitudinal plane, the longitudinal plane being defined as the plane oriented longitudinal the vessel and along the vessels height when the coupling system is assembled to the bow area of the vessel.

NO176240A describes a loading arrangement for loading of fluids in a vessel at sea. The loading arrangement includes a coupling manifold on board the vessel; a coupling part associated with the coupling manifold, a loading hose with a coupling head for coupling with said coupling part for providing a fluid flow connection between loading hose and coupling manifold, a bearing for the coupling manifold to swing about a horizontal axis and a device for causing the coupling frame to swing about the horizontal axis. The loading arrangement is characterized in that the coupling part is suspended in the coupling frame in a spherical suspension, and in that it an actuating device is provided between the coupling manifold and the coupling part for pivoting the coupling member in all planes on the spherical suspension.

Prior art also includes publications like AU 20111214362 A1 and NO 305233.

The APL multidirectional turret loading system represents a new way of thinking in offshore transfer of fluids to or from shuttle tankers. For loading at fixed moored FPSO's, vessels like shuttle tankers are positioned by dynamic positioning (DP), and at hose angles up to transvers to, or aft of transverse to the shuttle tanker centerline forward direction.

SUMMARY

The invention describes a multidirectional turret loading system for loading/unloading of fluid between an offshore installation and a vessel. The system comprises a winch for pulling a messenger line, a messenger line guide roller system and at least one motor. The system further comprises a turret rotated by the at least one motor and being positioned on the bow, on the sides or aft on the vessel with a mainly vertical rotational axis. The turret comprises a turret frame comprising a hose access opening and a messenger line access opening. The turret further comprises a bearing arrangement for rotation of the turret, a coupling manifold mounted near the hose access opening and a fluid line turret swivel mounted in the center of the turret connecting the coupling manifold to a fluid line of the vessel.

SHORT DESCRIPTION OF DRAWINGS

In order to improve the understanding of the invention a set of drawings are provided. Like numerals in different drawings represent the same features.

DETAILED DESCRIPTION

Figure 5:
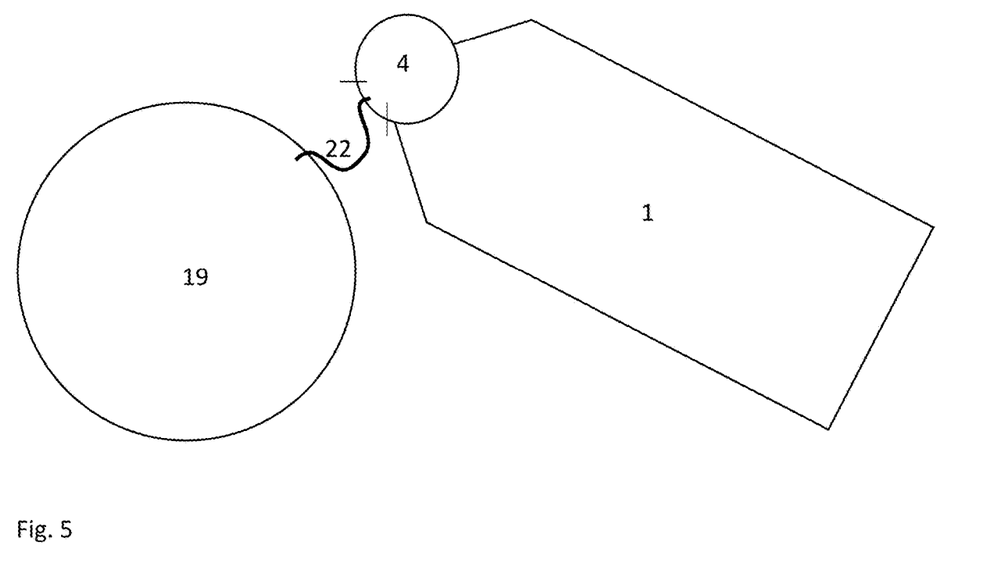
FIG. 5 shows a vessel connected to an offshore installation by means of Dynamic Positioning (DP).
Figure 6:
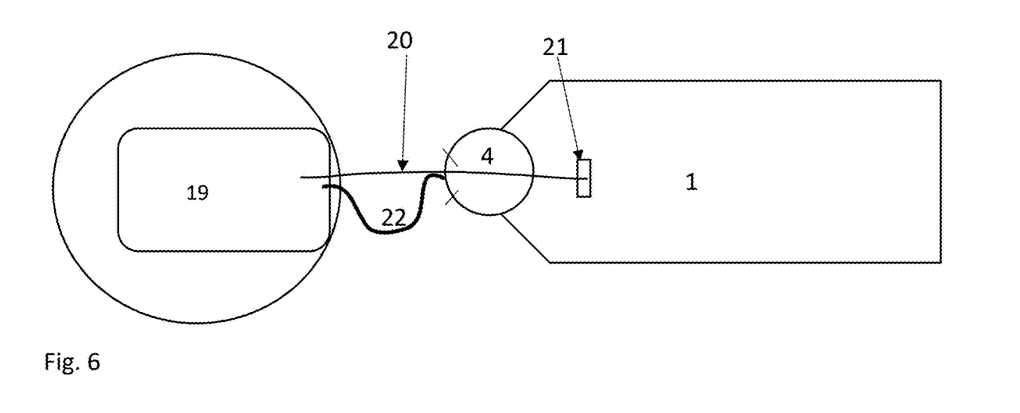
FIG. 6 shows a vessel connected to an offshore installation by means of hawser.
Figure 7A:
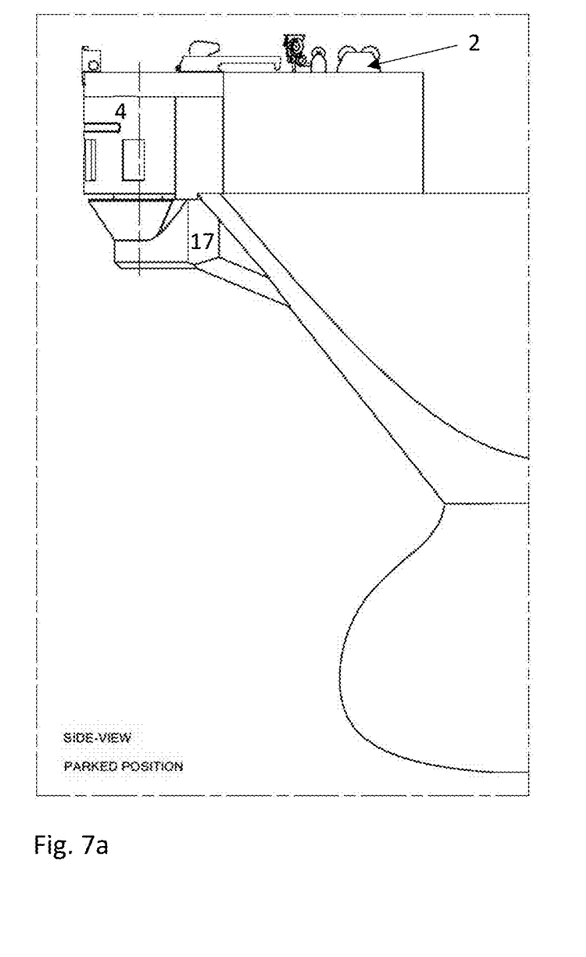
FIGS. 7a and 7b shows the multidirectional turret loading system in a stowed position seen from the side and from the front respectively
Figure 7B:
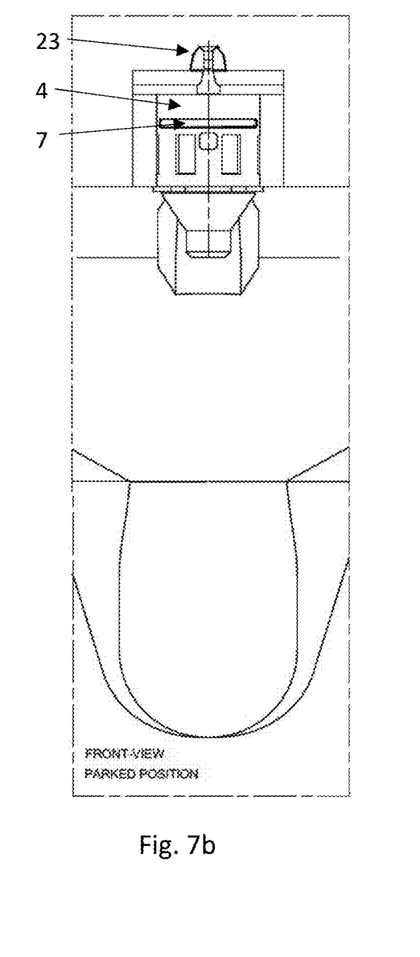

We will now describe a multidirectional loading system for loading/unloading of fluids between an offshore installation 19 and a vessel 1. The vessel may have a dynamic positioning system as seen in FIG. 5 or be connected by hawsers 20 as seen in FIG. 6. The vessel will typically be a shuttle tanker. It can also be any kind of vessel with a capacity to load/unload a fluid. When dynamic positioning is used it is common practice not to have the bow or stern of the vessel pointing in a direction towards the offshore installation from which fluid is loaded or unloaded. This is because the vessel is likely to move in a direction along the length of the vessel if the dynamic positioning system breaks down. Hence a loading/unloading system is needed whereby the vessel can be positioned in several directions relative to the offshore installation 19 and other structures present. To avoid unnecessary energy being spent in the dynamic positioning operation it is also an advantage to be able to direct the ship in an advantageous direction relative to wind, waves and current.

To solve these issues, we principally put a traditional BLS (Bow Loading System) into a turret, direct a fluid line through a fluid line swivel along the centerline of the turret and provide a novel messenger line roller system.

Figure 9:
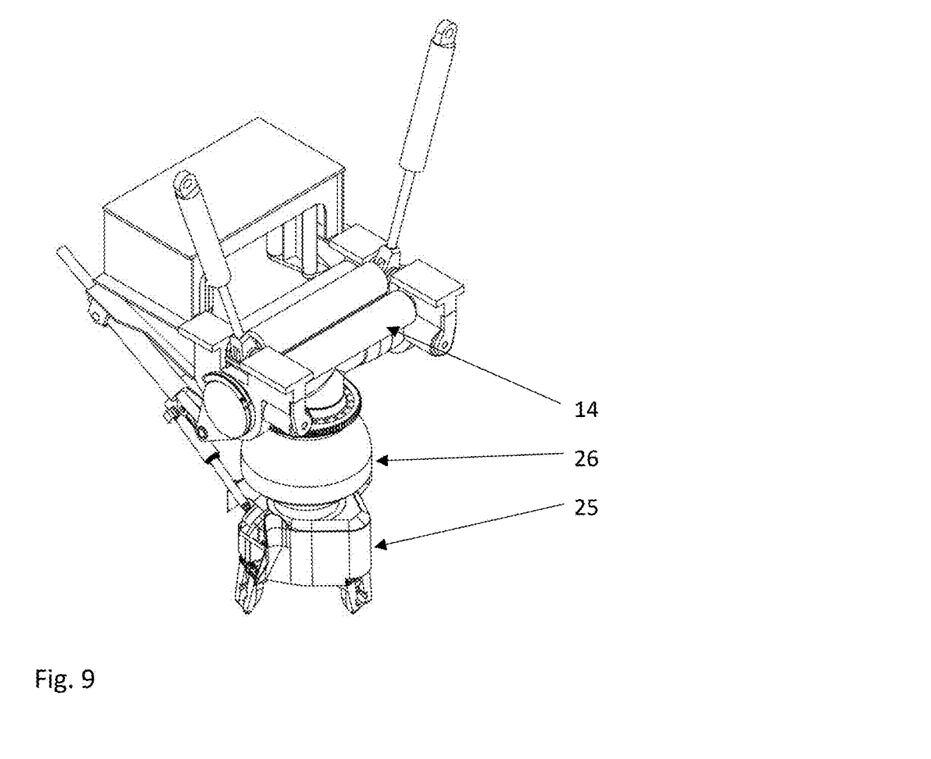
FIG. 9 shows a coupling manifold with coupling head, ball joint and manifold guide rollers.

The multidirectional turret loading system comprises a hose winch 2 for pulling a messenger line 3. The messenger line pulls the transfer hose 22 towards the coupling manifold. The coupling manifold 9 is preferably similar to a traditional bow loading manifold, but since the coupling is not limited to being mounted in the bow, we call it a coupling manifold 9. The coupling manifold 9 comprises a coupling head 25, for connection with the transfer hose 22, with a centerline having freedom to move at least within a cone centered around the most common direction of the transfer hose 22 during loading and unloading. FIG. 9 shows an example of a coupling manifold with manifold guide rollers 14 at the top. Below the manifold rollers is the ball joint 26 connected to a swivel with a horizontal axis (not shown) and the coupling head 25.

Figure 3:
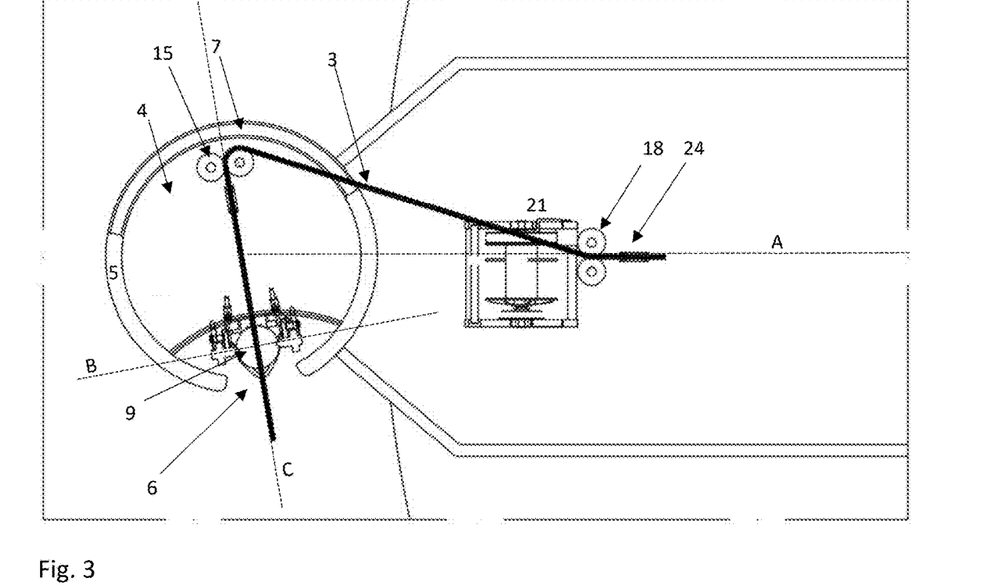
FIG. 3 shows a horizontal section of the invention shown in FIG. 2 at the altitude of the messenger line access opening.

In a preferred embodiment the coupling manifold 9 comprise a ball joint coupling and a swivel coupling having a horizontal rotational axis, marked with B, preferably perpendicular to a straight line going through the hose access opening 6 and the axis of the turret 4, marked with C, as shown in FIG. 3. This will provide the coupling with the freedom necessary to handle relative movements between the offshore installation and the vessel caused by wave action. For this to function well in daily operation the coupling head should be able to move at least 20 degree off center in any direction, preferably 25 degree off center.

In another embodiment the coupling manifold comprises two swivels each with a horizontal rotational axis, orthogonal onto each other.

Figure 2:
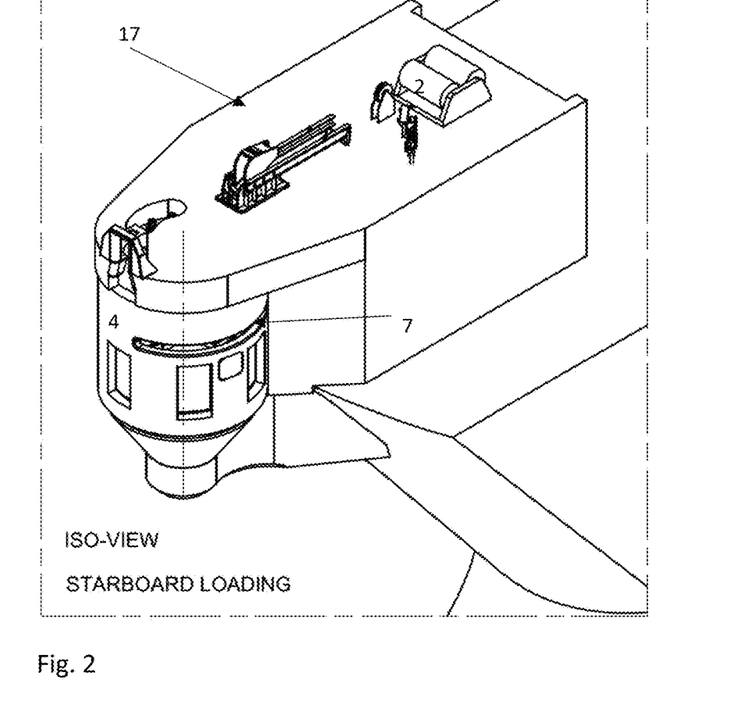
FIG. 2 shows a perspective view of the multidirectional turret loading system
Figure 4:
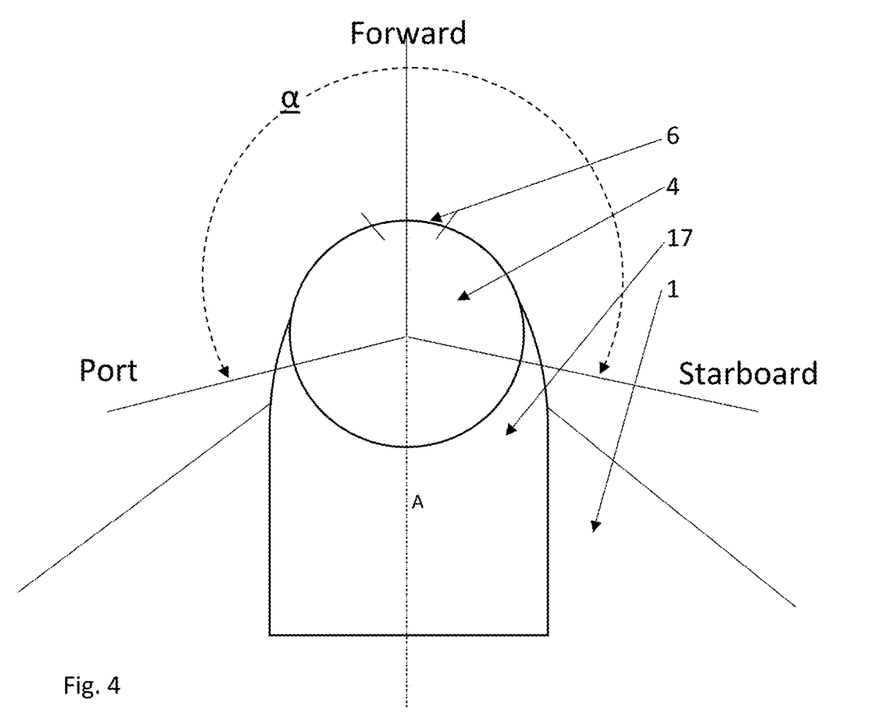
FIG. 4 shows the angular movement of turret mounted on a hull extension positioned on a bow of a vessel.

The turret 4 comprises a hose access opening 6 and a messenger line access opening 7 as seen in FIGS. 2 and 3. The hose access opening must be able to accommodate the movements of the transfer hose due to handling and wave action and the messenger line access opening 7 must accommodate the movement of the messenger line relative to the turret as the turret rotates. FIG. 4 shows a multidirectional loading system mounted on a hull extension 17 on the bow of a vessel 1. The dotted curved line represents all the angles, a, the hose access opening may have in relation to the longitudinal direction of the vessel and preferably be lockable in a loading position. Any position within the range of a is a possible loading position.

The messenger line 3 runs in a system of guide rollers, shown in FIG. 3, directing the messenger line from the coupling manifold to the hose winch 2. The hose winch is preferably mounted on the deck of the vessel and therefor the system of guide rollers must be able to handle the relative movement between the turret and the deck of the vessel. A set of manifold guide rollers 14 are positioned by the manifold to enable the transfer hose 22 to be pulled into contact with the coupling manifold. This is done in a similar manner to the traditional set up on a traditional BLS and will not be described in further detail.

In one embodiment a pair of horizontal turret frame guide rollers 15 is mounted on the turret frame 5 near the messenger line access opening 7, preferably near the center of the messenger line access opening. A number of rollers inside the turret may also be necessary in order to guide the messenger line around features inside the turret. Preferably the messenger line access opening is centered 180 degrees from the hose access opening. A pair of horizontal center guide rollers 18 is mounted on the vessel in the same altitude as the messenger line access opening 7 and near a line going through the axis of the turret and an extended middle line of all the possible loading positions. The mentioned line is marked as line A in FIGS. 3 and 4. The turret frame guide rollers 15 and the center guide rollers 18 have vertical rotational axes and alters the horizontal direction of the messenger line. Preferably the sides on the pairs of guide rollers contacting the messenger line are U-shaped and thus locks the messenger line in position.

Figure 1:
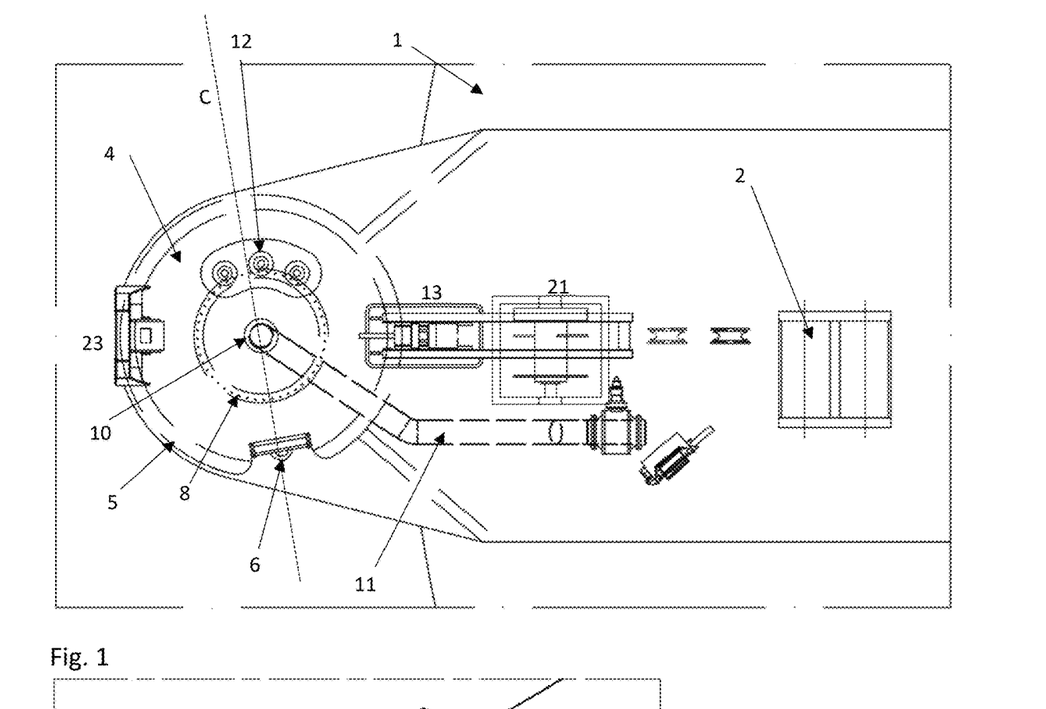
FIG. 1 shows a top view of an embodiment of the multidirectional turret loading system.

The hose winch 2 may be positioned directly after the center guide rollers 18 or one or more directional guide rollers 24 may direct the messenger line to the hose winch being positioned elsewhere. In a preferred embodiment the hose winch 2 is positioned on the deck of the vessel as shown in FIG. 2. FIGS. 1 and 3 also show a hawser winch 21, which is usually positioned in a different elevation than the messenger line roller system. The hawser winch 21 is active when, for instance, the vessel is attached to a single point mooring of some kind and is weather-vaning around the rotation axis of this mooring or is weather-vaning together with the offshore installation. In FIG. 1 we also see a chain stopper 13 and a fairlead 23 at the front of the bow.

The turret 4 according to the invention may be mounted on the bow, on the sides or aft on the vessel 1 with a mainly vertical rotational axis. It is particularly advantageous to mount the turret on the bow. This position will provide a flexible solution that can be used both for a traditional weather waning tandem loading configuration with the hose access opening 6 pointing straight forward, and a dynamic positioning configuration with the turret at a specific angle. Preferably the turret is lockable in the different loading positions to avoid constant wear on the motors.

The turret 4 comprises a bearing arrangement 8 for easy rotation of the turret. The Turret housing is supported to the vessel by the bearing arrangement in the top of the turret, in the bottom, in both positions or in other positions. Different arrangements have been described in the literature and we will not describe the bearing arrangement in detail. However, it does seem advantageous to have a circular bearing at the top of the turret as seen in FIG. 1. In one embodiment the bearing arrangement 8 is a slewing ring and the turret can be locked in position by means of a locking device, gripping teeth on the slewing ring.

Figure 8A:
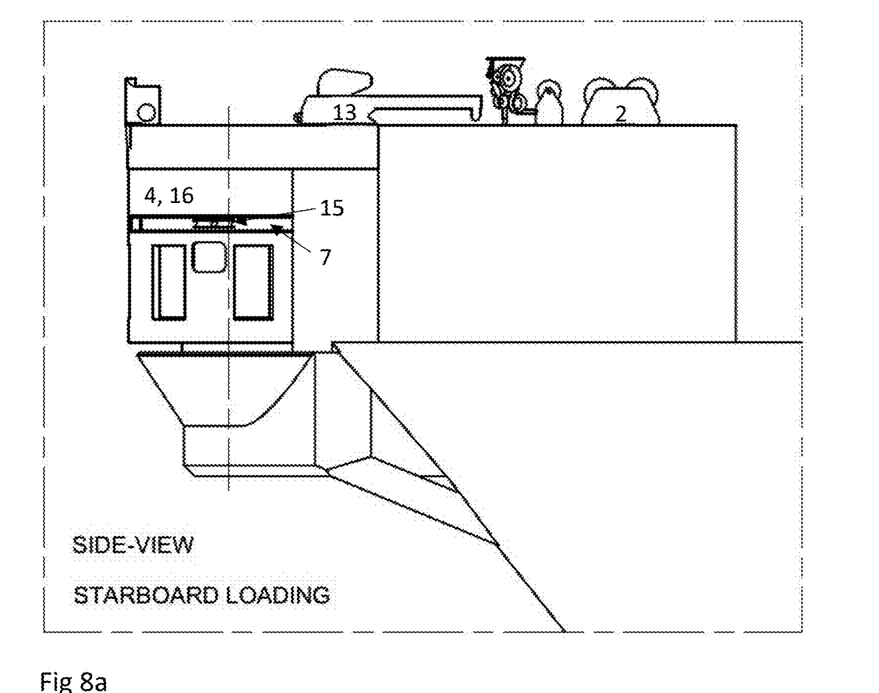
FIGS. 8a, 8b and 8c shows the multidirectional turret loading system in a position for loading from starboard, port and front respectively.
Figure 8B:
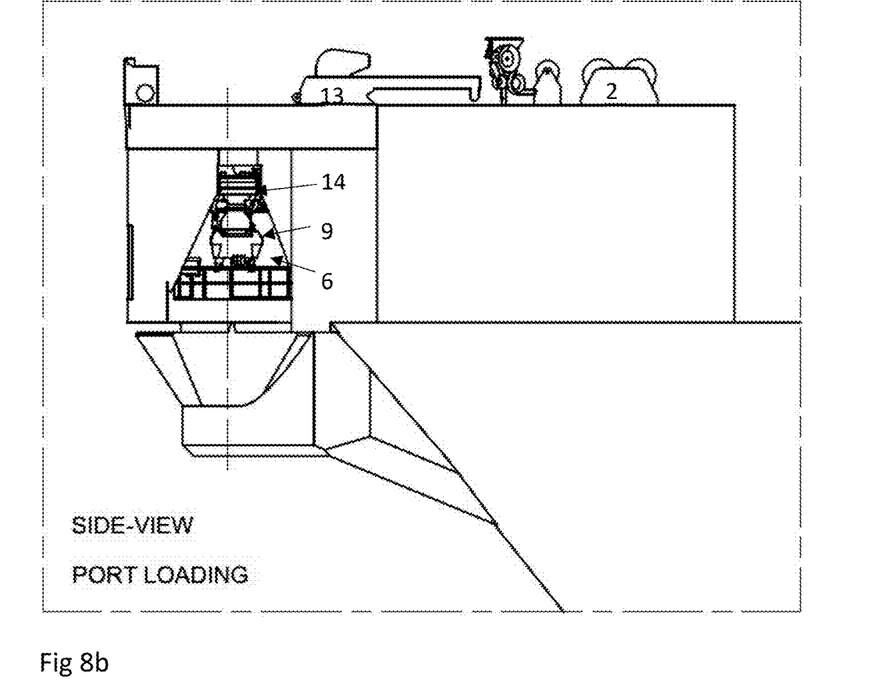
Figure 8C:
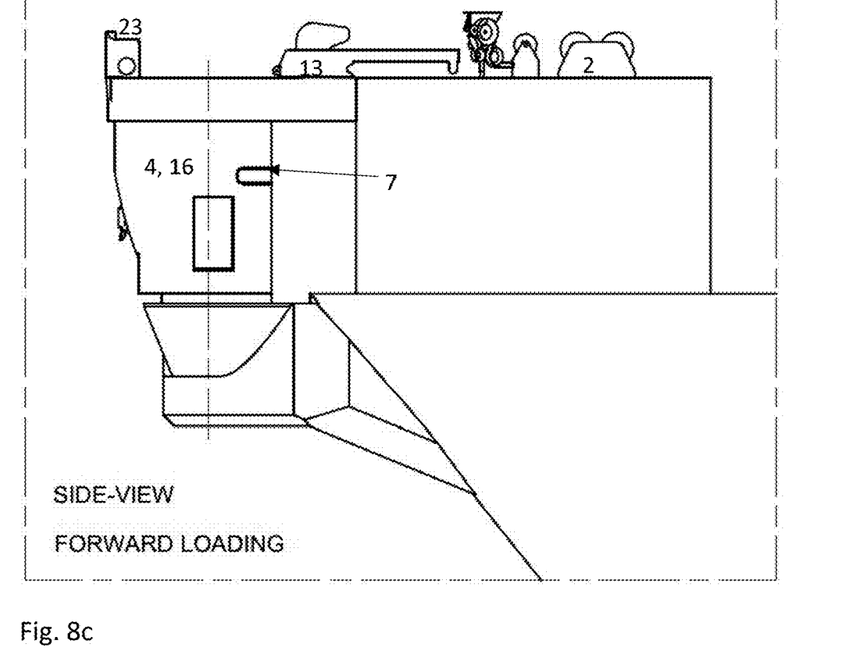

The coupling manifold 9 is mounted to the turret frame 5 near the hose access opening 6, as can be seen in FIG. 3. The turret is moveable from a stowed position with the hose access opening pointing in a direction towards the vessel, shown in FIG. 7 a and b, to loading positions with the hose access opening 6 pointing away from the vessel as shown in FIGS. 8a, b and c.

The turret further comprises a fluid line turret swivel 10 mounted in the center of the turret connecting the coupling manifold 9 to a fluid line 11 of the vessel.

To rotate the turret at least one motor 12 must be provided. In FIG. 1 we see three motors gripping a rim of teeth connected to a slewing ring attached to the turret frame 5.

Preferably the turret comprises a turret housing 16 mounted on the turret frame protecting the interior of the turret at least when the turret is in a stowed position.

In order to make the multidirectional loading system more flexible with regards to angular movement it is advantageous to mount the turret on a hull extension 17 as seen in FIGS. 2 and 4.

INVENTORY

1 Vessel
2 Winch
3 Messenger line
4 Turret
5 Turret frame
6 Hose access opening
7 Messenger line access opening
8 Bearing arrangement
9 Bow loading manifold/coupling manifold
10 Fluid line turret swivel
11 Fluid line
12 Motor
13 Chain stopper
14 Manifold guide rollers
15 Turret frame guide rollers
16 Turret housing
17 Hull extension
18 Center guide rollers
19 Offshore installation
20 Hawser
21 Hawser winch
22 Transfer hose
23 Fairlead
24 Directional guide roller
25 Coupling head
26 Ball joint

The invention claimed is:

1. A multidirectional turret loading system for loading/unloading fluid between an offshore installation and a vessel having a bow and sides, the system comprising:
   a winch for pulling a messenger line,
   at least one motor,
   a messenger line guide roller system, a turret rotated by the at least one motor and positioned on the bow, on the sides or aft on the vessel with a mainly vertical rotational axis comprising:
   a turret frame for mounting of constituent parts comprising:
   a hose access opening,
   a messenger line access opening,
   a bearing arrangement for rotation of the turret,
   a coupling manifold mounted near the hose access opening, and
   a fluid line turret swivel mounted in a center of the turret connecting the coupling manifold to a fluid line of the vessel, wherein the messenger line guide roller system comprises a set of manifold rollers mounted above the coupling manifold.

2. The multidirectional turret loading system according to claim 1, wherein the turret is moveable from a stowed position with the hose access opening pointing in a direction towards the vessel, to lockable loading positions with the hose access opening pointing away from the vessel.

3. The multidirectional turret loading system according to claim 1, wherein the turret is mounted on a hull extension extending from a hull of the vessel.

4. The multidirectional turret loading system according to claim 1, wherein the messenger line access opening has a center positioned on the turret frame 180 degrees from the hose access opening.

5. The multidirectional turret loading system according to claim 1, wherein the messenger line guide roller system comprises:
   a pair of horizontal turret frame guide rollers mounted on the turret frame near a center of the messenger line access opening,
   a pair of horizontal center guide rollers mounted on the vessel in a same altitude as the messenger line access opening.

6. The multidirectional turret loading system according to claim 5, wherein the pair of horizontal center guide rollers also are positioned near a line going through an axis of the turret and an extended middle line of all possible loading positions.

7. The multidirectional turret loading system according to claim 1, wherein the turret is fitted with a turret housing.

8. A method of using the multidirectional turret loading system according to claim 1, the vessel by Dynamic Positioning and locking the turret in a position with the hose access opening pointing mainly port or starboard, whichever is in a direction of the offshore installation.

9. A method of using the multidirectional turret loading system according to claim 1, the method comprising positioning the vessel by weather-vaning around, or together with, the offshore installation by a hawser and locking the turret in a position pointing mainly forward.

10. The multidirectional turret loading system according to claim 4, wherein the messenger line guide roller system comprises:
   a set of manifold rollers mounted above the coupling manifold,
   a pair of horizontal turret frame guide rollers mounted on the turret frame near the center of the messenger line access opening,
   a pair of horizontal center guide rollers mounted on the vessel in a same altitude as the messenger line access opening.

\* \* \* \* \*